US009160811B2

(12) United States Patent
Vuontisjarvi et al.

(10) Patent No.: US 9,160,811 B2
(45) Date of Patent: Oct. 13, 2015

(54) CLIENT PROVISIONING WITH ENHANCED LINKING

(75) Inventors: Mika Vuontisjarvi, Oulu (FI); Eero Kaappa, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1855 days.

(21) Appl. No.: 10/915,021

(22) Filed: Aug. 10, 2004

(65) Prior Publication Data

US 2006/0036714 A1 Feb. 16, 2006

(51) Int. Cl.
*G06F 15/177* (2006.01)
*H04L 29/08* (2006.01)
*H04L 12/24* (2006.01)

(52) U.S. Cl.
CPC ............ *H04L 67/34* (2013.01); *H04L 41/0806* (2013.01)

(58) Field of Classification Search
USPC ......................................................... 709/220
See application file for complete search history.

(56) References Cited

U.S. PATENT DOCUMENTS

| 5,457,680 | A | 10/1995 | Kamm et al. |
| 6,005,613 | A * | 12/1999 | Endsley et al. ............ 348/231.6 |
| 6,298,377 | B1 | 10/2001 | Hartikainen et al. |
| 6,629,145 | B1 | 9/2003 | Pham et al. |
| 7,142,503 | B1 * | 11/2006 | Grant et al. .................... 370/217 |
| 2002/0059404 | A1 | 5/2002 | Schaaf et al. |
| 2003/0074429 | A1 * | 4/2003 | Gieseke et al. ............... 709/221 |
| 2003/0074430 | A1 * | 4/2003 | Gieseke et al. ............... 709/221 |
| 2003/0101248 | A1 * | 5/2003 | Tofinetti et al. ............... 709/223 |
| 2003/0108039 | A1 * | 6/2003 | Shell et al. ...................... 370/389 |
| 2003/0224810 | A1 * | 12/2003 | Enzmann et al. .............. 455/466 |
| 2004/0093595 | A1 * | 5/2004 | Bilange ......................... 717/171 |
| 2004/0123241 | A1 * | 6/2004 | Kaappa et al. ................. 715/513 |
| 2005/0027851 | A1 * | 2/2005 | McKeown et al. ............ 709/224 |
| 2005/0038880 | A1 * | 2/2005 | Danforth ....................... 709/222 |
| 2005/0060392 | A1 * | 3/2005 | Goring et al. ................. 709/220 |
| 2005/0068581 | A1 * | 3/2005 | Hull et al. ..................... 358/1.16 |
| 2005/0176464 | A1 | 8/2005 | Sanchez |
| 2006/0148402 | A1 * | 7/2006 | Hagiwara ..................... 455/41.1 |
| 2006/0161839 | A1 * | 7/2006 | Pedersen ....................... 715/513 |
| 2006/0184456 | A1 * | 8/2006 | de Janasz ........................ 705/72 |
| 2007/0038765 | A1 * | 2/2007 | Dunn ............................. 709/229 |

FOREIGN PATENT DOCUMENTS

| EP | 1 555 791 A1 | 7/2005 |
| WO | WO 026323 A2 | 3/2003 |
| WO | WO 2004/014093 | 2/2004 |
| WO | WO 2004/062248 | 7/2004 |

OTHER PUBLICATIONS

Janne Vento, "Enhancing Linking Capability for Client Provisioning," Open Mobile Alliance, Aug. 18, 2004, 27 pp., Retrieved from Internet http://member.openmobilealliance.org/ftp/public_documents/dm/2004.

(Continued)

*Primary Examiner* — Richard G Keehn
(74) *Attorney, Agent, or Firm* — Alston & Bird LLP

(57) ABSTRACT

Methods, devices, systems, program products and computer-implemented methods for client provisioning are disclosed. A device includes a receiver configured to receive configuration information for the device. The configuration information includes one or more links indicative of settings. The device also includes a processor adapted to identify a first setting by a link indicative of a second setting.

25 Claims, 5 Drawing Sheets

(56) References Cited

OTHER PUBLICATIONS

Office Action for Taiwan Patent Application No. 94126904 dated Feb. 17, 2012.
Office Action for Chinese Application No. 200580032477.7; dated Jan. 4, 2013.
Office Action for India Application No. 1288/DELNP/2007 dated Dec. 15, 2014.
Extended European Search Report for European Application No. 05776672.7 dated Sep. 21, 2010.
English translation of Office action for Japanese Application No. 2007-525375 dated Nov. 22, 2010.
Open Mobile Alliance: "Provisioning Content Version 1.1., OMA-WAP-ProvCont-V1_1-20040720-C." Jul. 20, 2004.
Board Decision for Reexamination Chinese Application No. 200580032477.7 dated Jun. 15, 2015 (13 pages).

\* cited by examiner

CLIENT PROVISIONING WITH ENHANCED LINKING

FIELD OF THE INVENTION

The present invention relates to remote configuration of mobile devices. In particular, the invention provides for client provisioning with linking to facilitate more precise identification of Application Characteristic settings set.

BACKGROUND OF THE INVENTION

Client Provisioning is a technology used by carriers, device manufacturers, and corporate IT (information technology) departments to carry out remote configuration of mobile devices on behalf of users. OMA (Open Mobile Alliance) Client Provisioning is a provisioning standard based on sending provisioning information to the client in the form of a Provisioning Content Document. The OMA Provisioning Content Document is divided into several parts called characteristics. These characteristics include PXLOGICAL, NAPDEF, BOOTSTRAP, CLIENTIDENTITY, VENDOR-CONFIG, APPLICATION and ACCESS. The APPLICATION characteristic is used to define application protocol parameters and to describe the attributes of an application service access point available using the protocol. Different applications require different sets of parameters and the current Provisioning Content Document template is not able to fulfill the requirements of all applications.

The APPLICATION characteristic template in the Provisioning Content Document is used to identify connectivity-level settings. In the current template for APPLICATION characteristic, the context of the application settings is identified by the parameter PROVIDER-ID. However, if the mobile device includes multiple application settings of the same type with the same PROVIDER-ID, the desired settings included in the APPLICATION characteristic cannot be precisely defined.

Thus, there is a need for more precise identification of the application settings indicated in the characteristics of a provisioning content document.

SUMMARY OF THE INVENTION

The present invention is directed to methods, devices, systems, program products, and computer-implemented methods where client provisioning is done using a Provisioning Content Document with extended linking provided through the APPLICATION characteristics template.

In one embodiment, a method of client provisioning includes sending configuration information for a device. The configuration information including one or more links indicative of settings. The method also includes identifying a first setting by a link indicative of a second setting.

In another embodiment, a device adapted to be remotely configured is disclosed. The device includes a receiver configured to receive configuration information for the device, the configuration information including one or more links indicative of settings. The device also includes a processor adapted to identify a first setting by a link indicative of a second setting.

In another embodiment, a system for client provisioning includes a server computer adapted to send configuration information through a communication network and a client device adapted to receive the configuration information for the client device. The configuration information includes one or more links indicative of settings. The client device is further adapted to identify a first setting by the link indicative of a second setting.

Another embodiment of the invention includes a program product having machine readable program code for causing a machine to perform the following: receiving configuration information for a device, the configuration information including one or more links indicative of settings; and identifying a first setting by a link indicative of a second setting.

In another embodiment, a computer-implemented method includes receiving configuration information for a device, the configuration information including one or more links indicative of settings. The computer-implemented method also includes identifying a first setting by a link indicative of a second setting.

In another embodiment, a method for client provisioning includes sending a provisioning content document having at least one application characteristic template including configuration information for a device. The configuration information includes one or more links indicative of settings. The method also includes identifying a first setting by a link indicative of a second setting. The first setting and the second setting are application settings.

In another embodiment, a device adapted to be remotely configured includes a receiver configured to receive a provisioning content document having at least one application characteristic template including configuration information for the device. The configuration information includes one or more links indicative of settings. The device also includes a processor adapted to identify a first setting by a link indicative of a second setting. The first setting and the second setting are application settings.

In another embodiment, a system for client provisioning includes a server computer adapted to send a provisioning content document having at least one application characteristic template including configuration information through a communication network. The configuration information includes one or more links indicative of settings. The system also includes a client device adapted to receive the provisioning content document and the configuration information for the client device. The client device is further adapted to identify a first setting by a link indicative of a second setting. The first setting and the second setting are application settings.

Another embodiment of the invention includes a program product including machine readable program code for causing a machine to perform the following: receiving a provisioning content document having at least one application characteristic template including configuration information for a device, the configuration information including one or more links indicative of settings, and identifying a first setting by a link indicative of a second setting, wherein the first setting and the second setting are application settings.

In another embodiment, a computer-implemented method includes receiving a provisioning content document having at least one application characteristic template including configuration information for a device, the configuration information including one or more links indicative of settings, and identifying a first setting by a link indicative of a second setting, wherein the first setting and the second setting are application settings.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings, in which.

DETAILED DESCRIPTION OF EXEMPLARY EMBODIMENTS

Figure 1:
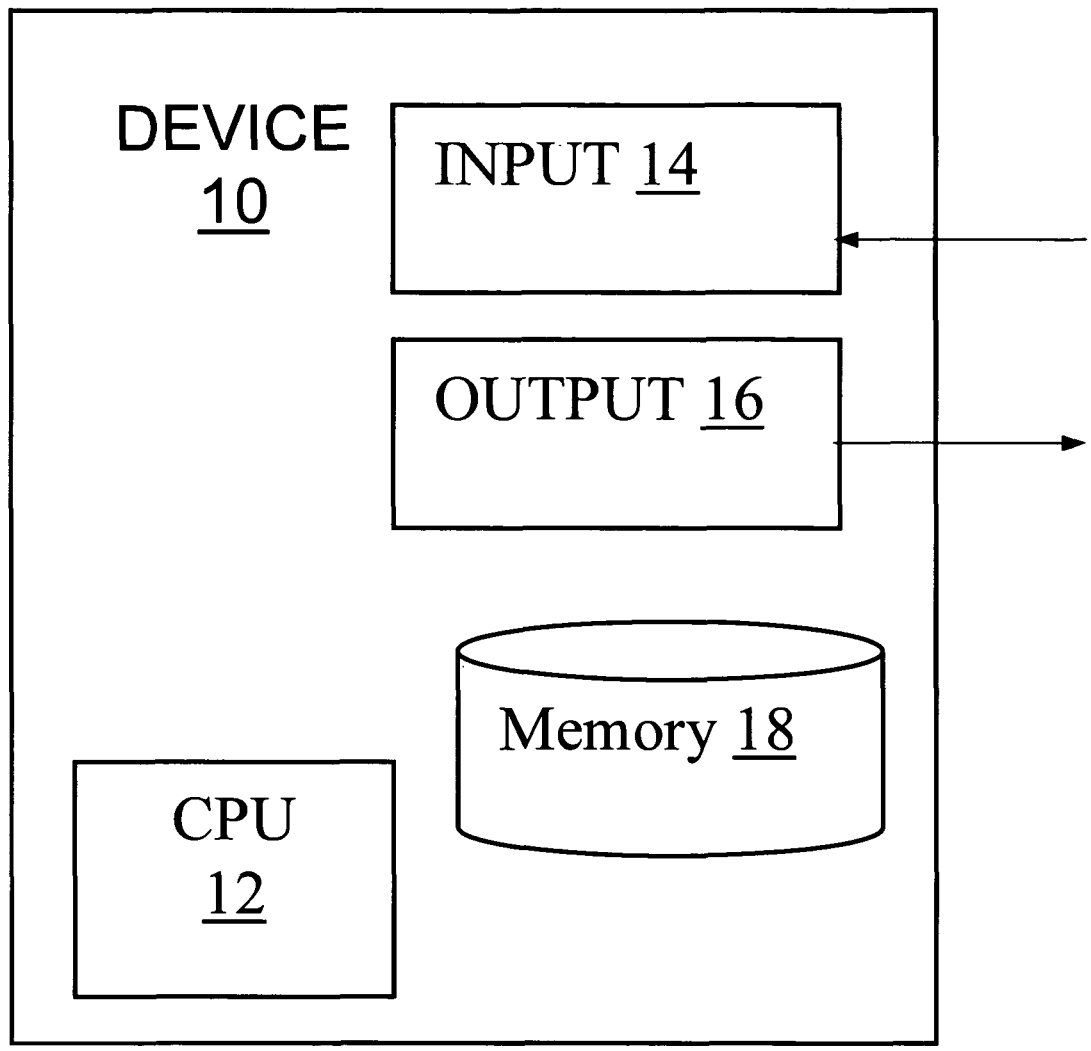
FIG. 1 is a diagrammatic representation of a device in accordance with an exemplary embodiment.

FIG. 1 illustrates a device 10 according to an exemplary embodiment. The device 10 includes a central processing unit (CPU) 12, an input 14, an output 16, and a memory 18. The device 10 can be configured according to provisioning information communicated to it from an outside source to the input 14. The CPU 12 processes the instructions included in the received provisioning information and stores information in the memory 18. The device 10 can be a phone, a personal digital assistant (PDA), a computer, or any other electronic device.

Figure 2:
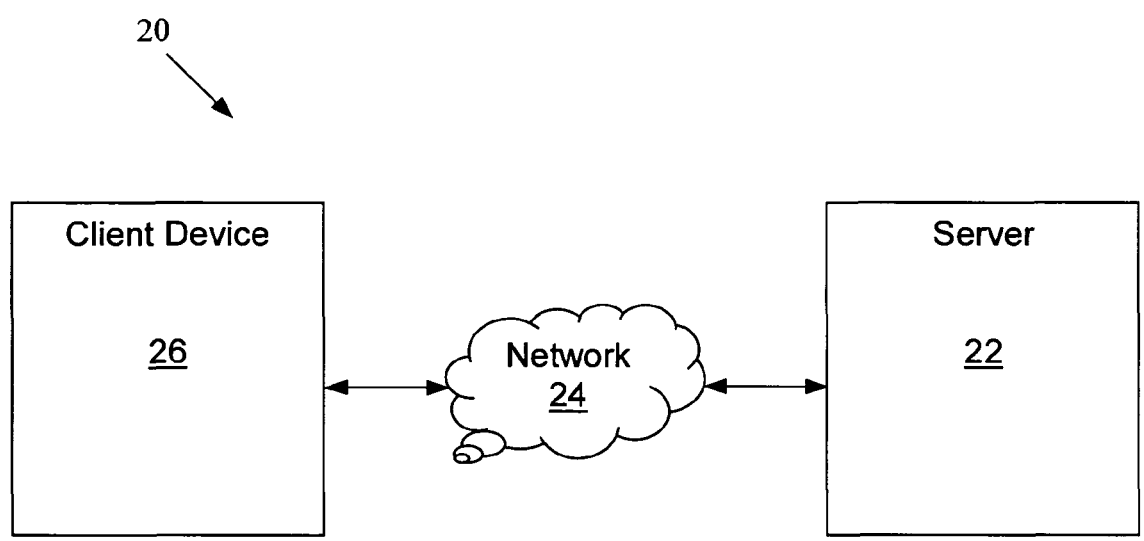
FIG. 2 is a diagrammatic representation of a client provisioning system in accordance with an exemplary embodiment.

FIG. 2 illustrates a client provisioning system 20 including a server 22, a network 24, and a client device 26, similar to the client device 10 of FIG. 1. The client device 26 communicates with the server 22 via the network 24. In an exemplary embodiment, the client device 26 is a communication device, such as a mobile telephone, and the network 24 is a wireless communication network. Alternatively, the client device 26 can be any kind of computing device.

The client device 26 can be remotely configured from the server 22 over the network 24. In a remote configuration or provisioning process, communication carriers, device manufacturers, or corporate information technology (IT) groups can configure the client device 26 by sending provisioning information over the network 24 to the client device 26. Provisioning information can include information, such as access point (AP) information or multimedia messaging service (MMS) information.

Figure 3:
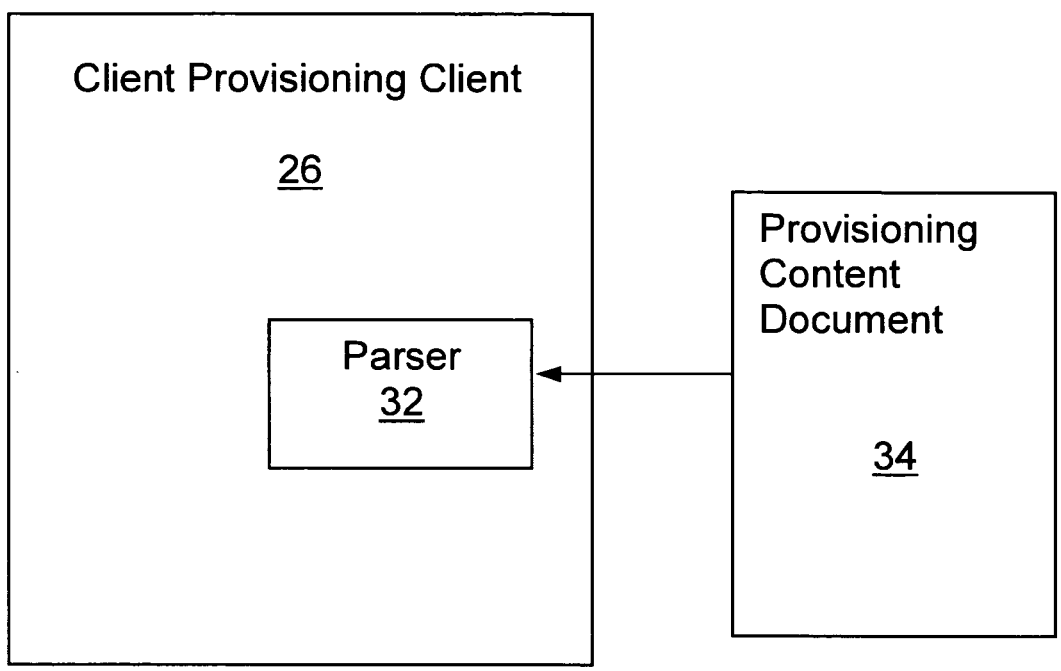
FIG. 3 is a diagrammatic representation of a client provisioning client in accordance with an exemplary embodiment.

FIG. 3 illustrates the client device 26 including a parser 32 that is configured to receive and understand a provisioning content document 34. The provisioning content document 34 includes provisioning information for configuring the client device 26. The provisioning content document 34 is divided into parts called characteristics. The APPLICATION characteristic is used to define application protocol parameters and to describe the attributes of an application service access point available using the protocol.

The APPLICATION characteristic includes multiple parameters related to the configuration of the device. An exemplary APPLICATION characteristic template at the root level is as follows:

```
characteristic: VENDORCONFIG *
{
        parm: NAME
        parm: TO-PROXY ?
        parm: TO-NAPID ?
        parm: TO-REFID ?
        parm: *
}
```

```
characteristic : APPLICATION *
{
        parm: APPID
        parm: PROVIDER-ID ?
        parm: REFID ?
        parm: TO-REFID *
        parm: NAME ?
        parm: AACCEPT ?
        parm: APROTOCOL ?
        parm: TO-PROXY *
        parm: TO-NAPID *
        parm: ADDR *
        characteristic : APPADDR *
        {
            parm: ADDR
            parm: ADDRTYPE ?
            characteristic: PORT *
            {
                parm: PORTNBR
                parm: SERVICE *
            }
        }
        characteristic : APPAUTH *
        {
            parm: AAUTHLEVEL ?
            parm: AAUTHTYPE ?
            parm: AAUTHNAME ?
            parm: AAUTHSECRET ?
            parm: AAUTHDATA ?
        }
}
```

In above example, the parameter PROVIDER-ID identifies the context of the application settings. In the event that multiple application settings of the same type and the same PROVIDER-ID are provided on the device, the PROVIDER-ID value may be insufficient to provide the processor with sufficient information to configure the device. In this regard, the linking parameters highlighted above are provided to more specifically identify the desired settings.

The linking parameters, such as REFID and TO-REFID, may create a logical link to the desired application settings. In this regard, the TO-REFID parameter in the APPLICATION characteristic may be provided with a logical link or a chain of links to precise settings. An example of the logical linking is described below with reference to FIG. 4. The linking parameters will now be described individually in greater detail.

The TO-REFID parameter is used as a link between two APPLICATION characteristics, so that the settings with TO-REFID with matching value with the REFID of the other APPLICATION characteristic (settings) creates a chain of settings. Vendors may elect to publish their own TO-REFID extensions and guides to use these extensions so that servers are able to easily support those vendor specific features and thus be more interoperable.

The REFID parameter is used for identifying the APPLICATION characteristic of the provisioning message that provides the terminal with a set of settings. If there exist several settings of the same type in one configuration context and more than one other application settings make use of those settings, the REFID parameter allows distinction and specific identification of the desired settings.

Thus, the combination of REFID and TO-REFID in corresponding characteristics allows for linking to properly identify the desired settings. Although the above illustration describes the applicability of such an arrangement for linking to the APPLICATION and VENDORCONFIG characteristics, those skilled in the art will understand that the arrangement may be equally applicable to various other characteristics.

The TO-PROXY parameter refers to a logical proxy with a matching PROXY-ID. Each application may correspond to a list of one or more TO-PROXY parameters. The order of the list may indicate the priority of the proxies.

The TO-NAPID parameter refers to a network access point with a matching NAPID parameter. Several TO-NAPID parameters may be listed for a given application, with the order of the list indicating the priority of the individual network access points. One TO-NAPID may have a special, pre-defined meaning. Specifically, if the TO-NAPID is INTERNET, it implies that any network access point with the attribute INTERNET defined can be selected.

Figure 4:
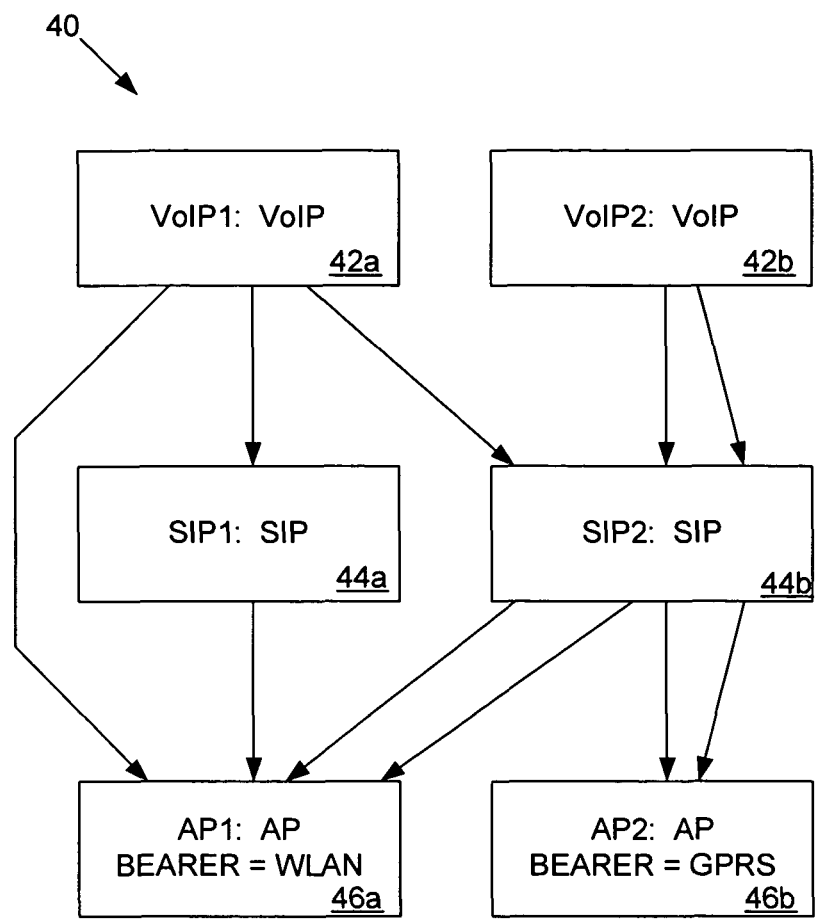
FIG. 4 is a diagrammatic representation of a client provisioning arrangement using linking in accordance with an exemplary embodiment.

In the example of FIG. 4, if a device is to be configured for a Voice-over-IP application, the APPLICATION characteristic template may be provided with a TO-REFID parameter having a value "VoIP1." Multiple entries for TO-REFID may be provided, corresponding to multiple REFID's, to indicate further linking, such as "SIP*" and "APN*." In other embodiments, a TO-REFID parameter may include a series of values to indicate the complete chain of links, such as "VoIP1, SIP*, APN*." Thus, as illustrated in FIG. 4, if the device includes multiple application characteristics and multiple characteristics for network access points, a logical link to every possible desired instance of a setting can be specified.

For example, in FIG. 4, the parameter PROVIDER-ID may be sufficient to indicate configuration using VoIP1 42a, rather than VoIP2 42b. However, PROVIDER-ID may be insufficient to identify the desired session initiation protocol (SIP1 44a or SIP2 44b) and the desired network access point (wireless local area network through AP1 46a or GPRS through AP2 46b). In this regard, the value of the parameter TO-REFID may indicate the desired linking to each level. For example, the parameter TO-REFID can specify VoIP1 using SIP2 through AP1.

It is noted that, in certain embodiments, the parameters TO-REFID and PROVIDER-ID may be merged. In this regard, the parameter PROVIDER-ID may be modified to accept a link value or a chain of link values. Alternatively, the PROVIDER-ID value may be modified to represent a unique global identifier which can be referred to through a link. Thus, the link may represent each instance of a setting with a unique identifier.

Figure 5:
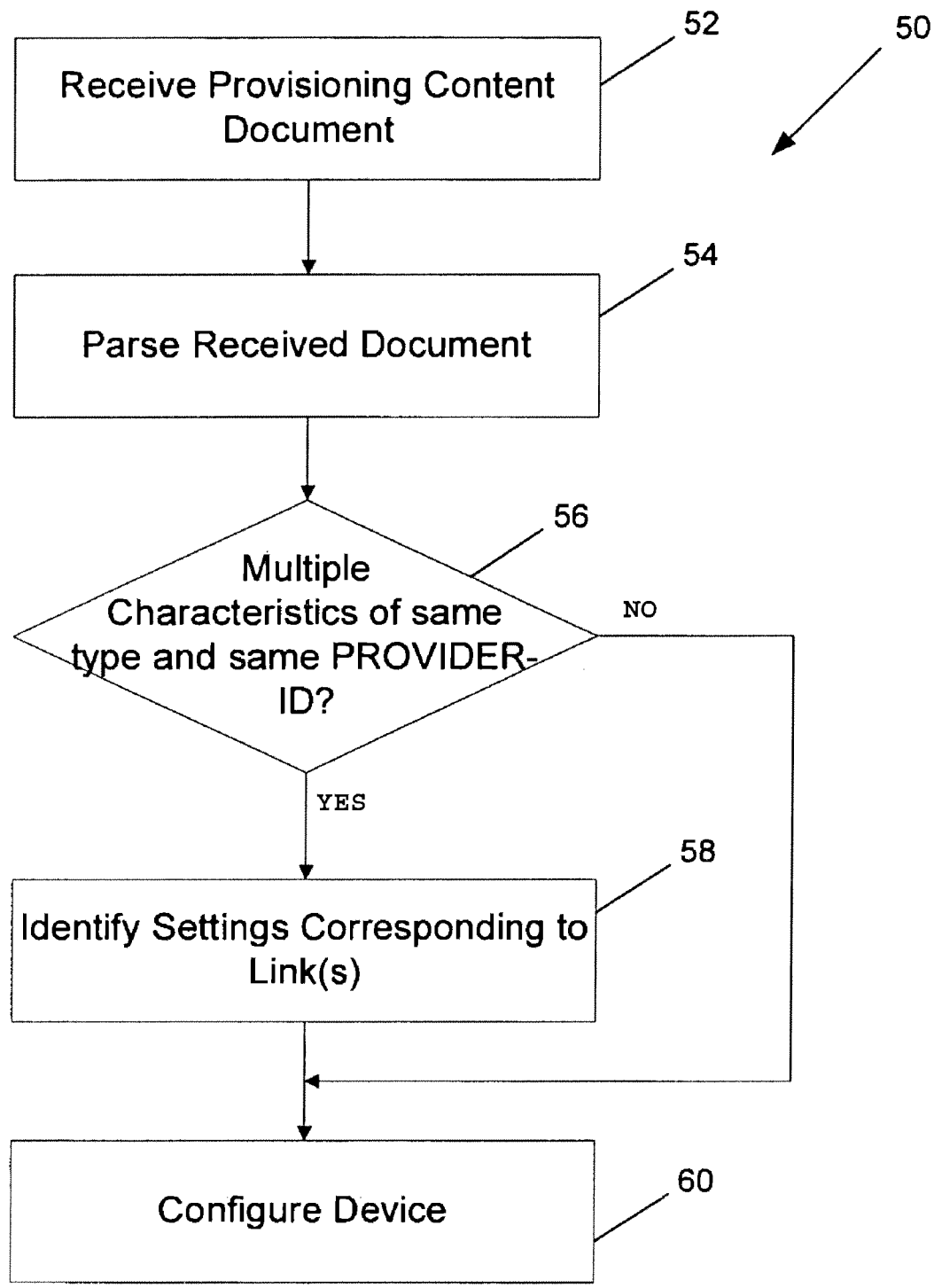
FIG. 5 is a flow chart illustrating a client provisioning method using an application characteristics template with linking in accordance with an exemplary embodiment.

FIG. 5 is a flow chart 50 illustrating an exemplary method of client provisioning using linking. Additional, fewer, or different operations may be performed in accordance with alternative embodiments.

The method 50 starts when a device receives a provisioning content document having configuration information from a communication network, such as a wireless network (block 52). The device can receive the provisioning content document as part of a subscriber set up procedure or as part of a configuration procedure for an existing subscriber.

At block 54, a processor in the device parses the provisioning content document. The provisioning content document may include a plurality of characteristics, such as the APPLICATION characteristic. Once the provisioning content document has been parsed, the processor may attempt to identify the desired settings.

In certain embodiments, the APPLICATION characteristic template may include both the PROVIDER-ID parameter and the TO-REFID parameter. In such cases, the processor may determine whether multiple characteristics of the same type and same PROVIDER-ID exist in the device (block 56). If the determination is made that multiple characteristics do not exist, the processor proceeds to block 60 and configures the device accordingly. If the determination is made that multiple characteristics do exist, the processor proceeds to block 58.

In other embodiments, the PROVIDER-ID and the TO-REFID parameters may be merged. In this regard, one or the other of these parameters may be eliminated in the APPLICATION characteristic template. In such embodiments, the processor may bypass the determination at block 56 and may proceed directly to block 58.

At block 58, the processor examines the link and identifies the corresponding settings. As noted above, the link may include a chain of links identifying settings at multiple levels. The processor then proceeds to block 60 and configures the device accordingly.

Thus, the linking broadens the usage of the characteristic template, such as the APPLICATION characteristic template.

In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A method, comprising:
   receiving a provisioning content document, said provisioning content document being divided into several characteristics, comprising one or more configuration settings for configuring a device, wherein a first characteristic of said provisioning content document comprises a first configuration setting and a linking parameter linking said first characteristic to a second characteristic, said second characteristic comprising a second configuration setting;
   parsing the provisioning content document;
   identifying, by the device, said second configuration setting as a desired configuration setting using said linking parameter, linking said first characteristic to said second characteristic; and
   configuring the device using said identified desired configuration setting,
   wherein a configuration setting comprises a set of one or more parameters and attributes for configuring the device, and
   said second characteristic comprises another linking parameter linking said second characteristic to another characteristic creating a chain of configuration settings.

2. The method of claim 1, wherein a linking parameter is indicative of a unique identifier for a characteristic.

3. An apparatus, comprising:
   a receiver configured to receive a provisioning content document, said provisioning content document being divided into several characteristics, comprising one or more configuration settings for configuring the apparatus, wherein a first characteristic of said provisioning content document comprises a first configuration setting and a linking parameter linking said first characteristic to a second characteristic, said second characteristic comprising a second configuration setting; and
   a processor configured to cause the apparatus to:

parse the provisioning content document;
identify said second configuration setting as a desired configuration setting using said linking parameter, linking said first characteristic to said second characteristic; and
configure the device using said identified desired configuration setting,
wherein a configuration setting comprises a set of one or more parameters and attributes for configuring the apparatus, and
said second characteristic comprises another linking parameter linking said second characteristic to another characteristic creating a chain of configuration settings.

4. The apparatus of claim 3, further comprising:
a parser configured to parse the provisioning content document.

5. The apparatus of claim 4, wherein the parser is integral with the processor.

6. The apparatus of claim 3, wherein a linking parameter is indicative of a unique identifier for a characteristic.

7. The apparatus of claim 3, wherein the apparatus is a mobile device.

8. The apparatus of claim 7, wherein the apparatus comprises a mobile phone.

9. A system, comprising:
a server computer configured to send, through a communication network, a provisioning content document, said provisioning content document being divided into several characteristics, comprising one or more configuration settings for configuring a device, wherein a first characteristic of said provisioning content document comprises a first configuration setting and a linking parameter linking said first characteristic to a second characteristic, said second characteristic comprising a second configuration setting; and
a client device configured to:
receive said provisioning content document;
parse the provisioning content document;
identify said second configuration setting as a desired configuration setting using said linking parameter, linking said first characteristic to said second characteristic; and
configure the client device using said identified desired configuration setting,
wherein a configuration setting comprises a set of one or more parameters and attributes for configuring the client device, and
said second characteristic comprises another linking parameter linking said second characteristic to another characteristic creating a chain of configuration settings.

10. The system of claim 9, wherein the first characteristic and the second characteristic are application characteristics, and wherein an application characteristic comprises application parameters and attributes of an application service access point.

11. The system of claim 9, wherein a linking parameter is indicative of a unique identifier for a characteristic.

12. The system of claim 9, wherein the client device is a mobile device.

13. The system of claim 12, wherein the client device comprises a mobile phone.

14. The system of claim 12, wherein the communication network is a wireless network.

15. A program product, embodied on a non-transitory machine readable medium, for causing a machine, when executed, to perform the following:

receiving a provisioning content document, said provisioning content document being divided into several characteristics, comprising one or more configuration settings for configuring a device, wherein a first characteristic of said provisioning content document comprises a first configuration setting and a linking parameter linking said first characteristic to a second characteristic, said second characteristic comprises a second configuration setting;
parsing the provisioning content document,
identifying said second configuration setting as a desired configuration setting using said linking parameter, linking said first characteristic to said second characteristic; and
configuring the device using said identified desired configuration setting,
wherein a configuration setting comprises a set of one or more parameters and attributes for configuring the device, and
said second characteristic comprises another linking parameter linking said second characteristic to another characteristic creating a chain of configuration settings.

16. The program product of claim 15, wherein the first characteristic and the second characteristic are application characteristics, and wherein an application characteristic comprises application parameters and attributes of an application service access point.

17. The program product of claim 15, wherein a linking parameter is indicative of a unique identifier for a characteristic.

18. A method, comprising:
sending, by a server computer, a provisioning content document, said provisioning content document being divided into several characteristics, comprising one or more configuration settings for configuring a client device, wherein a first characteristic, of said provisioning content document, comprises a linking parameter linking said first characteristic to a second characteristic, said second characteristic comprising a second configuration setting;
wherein said linking parameter is used by the client device to identify said second configuration setting as a desired configuration setting for configuring the client device,
wherein a configuration setting comprises a set of one or more parameters and attributes for configuring the client device, and
said second characteristic comprises another linking parameter linking said second characteristic to another characteristic creating a chain of configuration settings.

19. The method of claim 18, wherein the first characteristic and the second characteristic are application characteristics, and wherein an application characteristic comprises application parameters and attributes of an application service access point.

20. The method of claim 18, wherein a linking parameter is indicative of a unique identifier for a characteristic.

21. A server computer, comprising:
a sender configured to send a provisioning content document to a client device, said provisioning content document being divided into several characteristics, comprising one or more configuration settings for configuring the client device, wherein a first characteristic, of said provisioning content document comprises a linking parameter linking said first characteristic to a second characteristic, said second characteristic comprising a second configuration setting;

wherein said linking parameter is used by the client device to identify said second configuration setting as a desired configuration setting for configuring the client device, wherein a configuration setting comprises a set of one or more parameters and attributes for configuring the client device, and said second characteristic comprises another linking parameter linking said second characteristic to another characteristic creating a chain of configuration settings.

22. The server computer of claim 21, wherein a linking parameter is indicative of a unique identifier for a characteristic.

23. A program product, embodied on a non-transitory machine readable medium, for causing a machine, when executed, to perform the following:

sending a provisioning content document, said provisioning content document being divided into several characteristics, comprising one or more configuration settings for configuring a client device, wherein a first characteristic of said provisioning content document comprises a linking said first characteristic to a second characteristic, said second characteristic comprising a second configuration setting;

wherein said linking parameter is used by the client device to identify said second configuration setting as a desired configuration setting for configuring the client device, wherein a configuration setting comprises a set of one or more parameters and attributes for configuring the client device, and said second characteristic comprises another linking parameter linking said second characteristic to another characteristic creating a chain of configuration settings.

24. The program product of claim 23, wherein the first characteristic and the second characteristic are application characteristics, and wherein an application characteristic comprises application parameters and attributes of an application service access point.

25. The program product of claim 23, wherein a linking parameter is indicative of a unique identifier for a characteristic.

* * * * *